United States Patent
Kuo et al.

(10) Patent No.: US 7,000,250 B1
(45) Date of Patent: Feb. 14, 2006

(54) VIRTUAL OPENED SHARE MODE SYSTEM WITH VIRUS PROTECTION

(75) Inventors: Chengi Jimmy Kuo, Torrance, CA (US); Igor G. Muttik, Berkhamsted (GB); Dmitry O. Gryaznov, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 830 days.

(21) Appl. No.: 09/916,606

(22) Filed: Jul. 26, 2001

(51) Int. Cl.
*G06F 11/00* (2006.01)
*G06F 11/32* (2006.01)

(52) U.S. Cl. .......................... 726/22; 713/188; 726/24
(58) Field of Classification Search ................ 713/201, 713/200, 188; 726/22, 24
See application file for complete search history.

(56) References Cited

U.S. PATENT DOCUMENTS

| | | | | |
|---|---|---|---|---|
| 5,842,002 A | * | 11/1998 | Schnurer et al. ............. | 703/21 |
| 5,991,881 A | * | 11/1999 | Conklin et al. ............. | 713/201 |
| 6,073,239 A | * | 6/2000 | Dotan ........................ | 713/200 |
| 6,240,530 B1 | * | 5/2001 | Togawa ...................... | 714/38 |
| 6,269,447 B1 | * | 7/2001 | Maloney et al. ............. | 713/201 |
| 6,457,022 B1 | * | 9/2002 | Hutchison et al. .......... | 707/204 |
| 6,704,874 B1 | * | 3/2004 | Porras et al. ............... | 713/201 |
| 6,775,780 B1 | * | 8/2004 | Muttik ....................... | 713/200 |
| 2002/0073323 A1 | * | 6/2002 | Jordan ........................ | 713/188 |
| 2002/0083341 A1 | * | 6/2002 | Feuerstein et al. .......... | 713/201 |
| 2002/0099944 A1 | * | 7/2002 | Bowlin ....................... | 713/185 |
| 2002/0104006 A1 | * | 8/2002 | Boate et al. ................. | 713/186 |
| 2002/0133710 A1 | * | 9/2002 | Tarbotton et al. ........... | 713/188 |

FOREIGN PATENT DOCUMENTS

| | | |
|---|---|---|
| JP | 08134827 | 12/1997 |
| WO | 94/14127 | 6/1994 |
| WO | 00/05852 | 2/2000 |

* cited by examiner

*Primary Examiner*—Emmanuel L. Moise
*Assistant Examiner*—Kevin Schubert
(74) *Attorney, Agent, or Firm*—Zilka-Kotab, PC; Christopher J. Hamaty (57) ABSTRACT

A system, method and computer program product are provided for protecting a computer in an opened share mode. Initially, a computer is run on a network in an opened share mode. In operation, attempts to access the computer by applications are monitored. Further, it is determined whether the applications attempt to modify the computer. A security event is then executed in response to any attempt to modify the computer.

35 Claims, 6 Drawing Sheets

VIRTUAL OPENED SHARE MODE SYSTEM WITH VIRUS PROTECTION

FIELD OF THE INVENTION

The present invention relates to virus scanning methods, and more particularly to preventing virus infiltration of a network.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is ongoing, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

Contemporary malicious programs are capable of using accessible network storage for propagation between different computers. If a remote computer has an "opened share" (i.e. part of the storage that external computers have rights to modify), a malicious program can copy itself to the share or cause damage to data in the share. Modern network worms spread in this manner, and have an ability to quickly infest badly managed network environments. For new and unknown viruses, such improperly configured networks provide an ability to spread or cause damage.

There is thus a need for preventing virus propagation through opened share network environments.

DISCLOSURE OF THE INVENTION

A system, method and computer program product are provided for protecting a computer in an opened share mode. Initially, a computer is run on a network in an opened share mode. In operation, attempts to access the computer by applications are monitored. Further, it is determined whether the applications attempt to modify the computer. A security event is then executed in response to any attempt to modify the computer.

In one embodiment, the opened share mode may allow other computers on the network to access data stored on the computer. In one aspect of the present embodiment, the opened share mode may include a virtual opened share mode. Such virtual opened share mode may indicate to other computers of an ability to write to the computer, when, in fact, no actual ability to write is given. Such virtual opened share mode thus entices potential attacks for identifying the same, and rectifying any situation via the security event.

In another embodiment, the opened share mode may indicate a file structure parameter and/or a name parameter. As an option, the computer may be run on the network in a plurality of opened share modes. In particular, the aforementioned parameters may include a first set of parameters indicative of data accessible via a legitimate opened share mode, and a second set of parameters indicative of data only appearing to be accessible via a virtual opened share mode. The present embodiment may thus respond to any attempt to modify data accessible via the virtual opened share mode with the security event. As an option, such parameters accessible via the virtual opened share mode may be randomly selected to prevent detection of the virtual nature of the parameters.

The computer may operate in the opened share mode by modifying an application program interface. Such application program interface may include an operating system application program interface and/or a network application program interface.

Optionally, the opened share mode may apply to each of a plurality of networks of which the computer is a member. Further, the opened share mode may apply only to a predetermined list of application programs executable on the computer. Such predetermined list may be created manually and/or automatically.

In yet another embodiment, any attempt to modify the computer may be utilized in a heuristic analysis for identifying a coordinated attack on multiple computers. Such attempts to modify the computer may be tracked during such process.

In still another embodiment, it is determined whether the applications attempt to write to memory in the computer. In response to such attempt, the computer security event may be executed. Further, it may be determined whether the applications attempt to copy a virus to memory in the computer, and the security event may be executed in response thereto.

The security event may include logging the computer off the network in response to any attempt to modify the computer. Further, the security event may include terminating the application attempting to modify the computer. Still yet, the security event may include deleting the application attempting to modify the computer. The security event may also include an alert transmitted via the network. Such alert may include information associated with the application attempting to modify the computer.

In still yet another embodiment, the present protection technique may be implemented on a gateway. In such embodiment, the security event may include blocking access to the computer.

DESCRIPTION OF THE PREFERRED EMBODIMENTS

Figure 1:
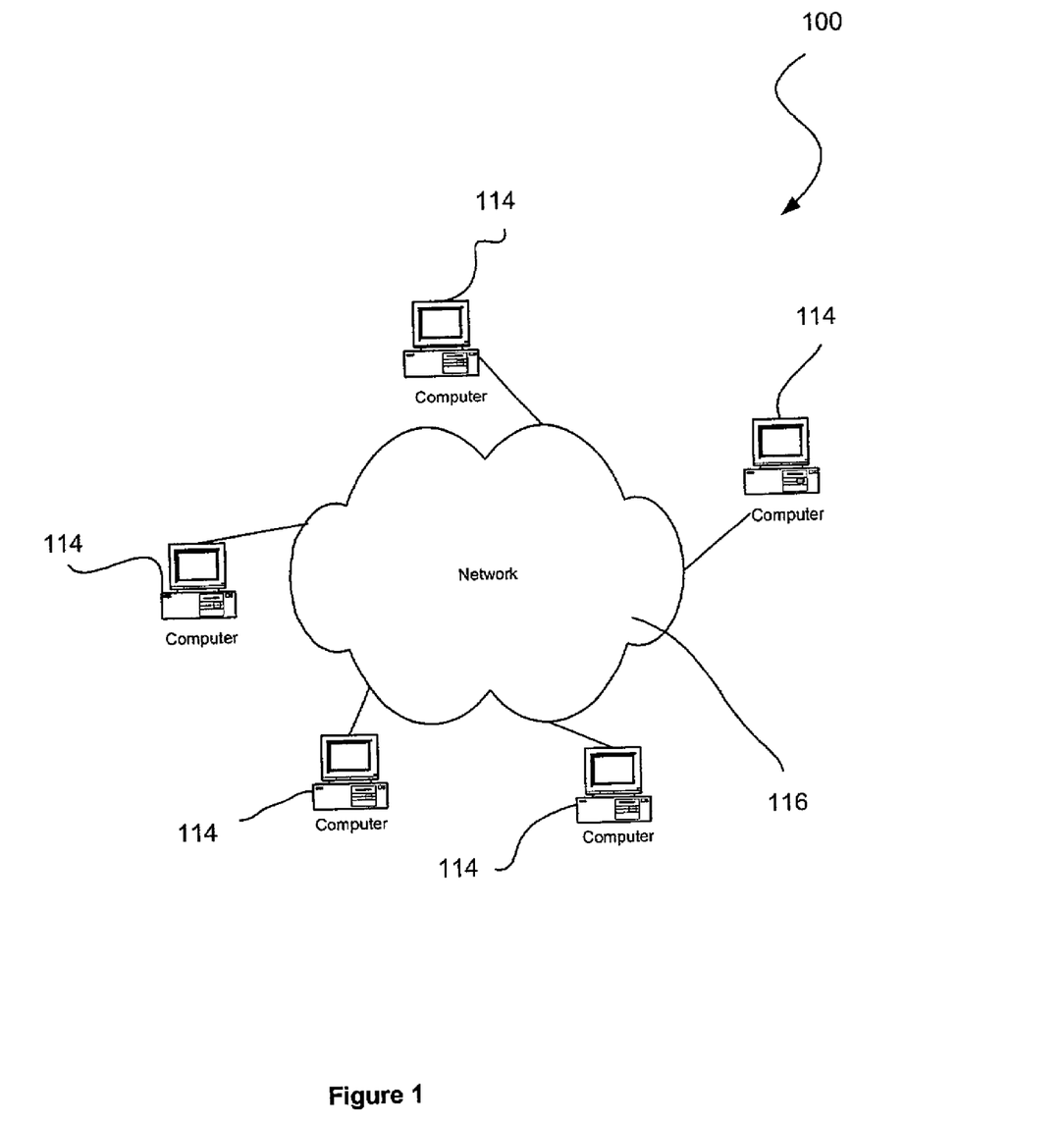
FIG. 1 illustrates a network architecture, in accordance with one embodiment.

FIG. 1 illustrates a network architecture 100, in accordance with one embodiment. As shown, a plurality of computers 114 is coupled to a network 116. In the context of the present network architecture 100, the network 116 may take any form including, but not limited to a local area network (LAN), a wide area network (WAN) such as the Internet, etc. Further, the computers 114 may include a web server, desktop computer, lap-top computer, hand-held computer, printer or any other type of hardware/software.

Figure 2:
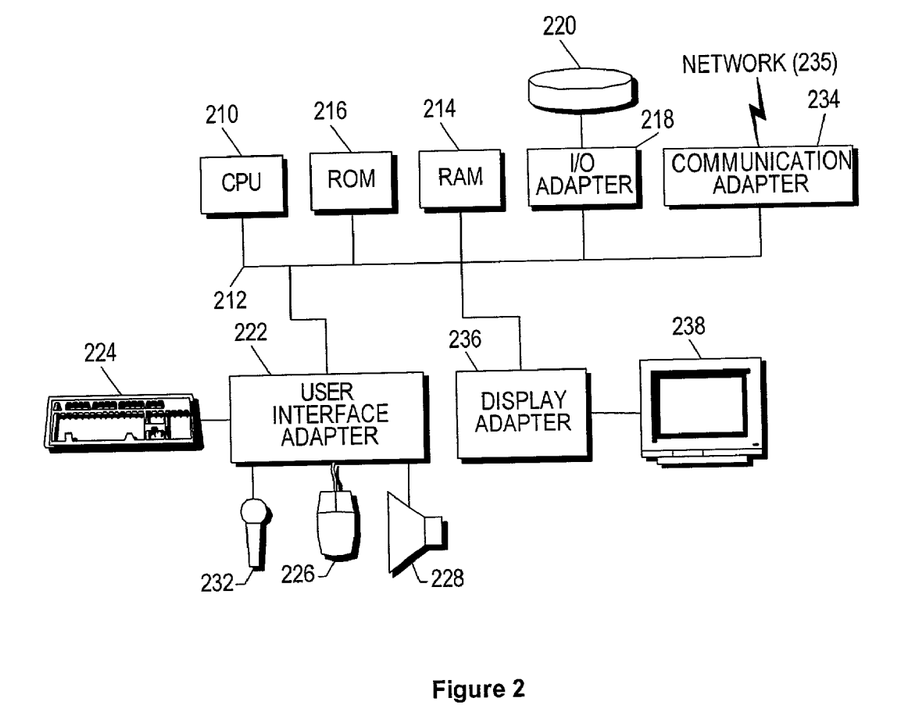
FIG. 2 shows a representative hardware environment that may be associated with the computers of FIG. 1, in accordance with one embodiment.

FIG. 2 shows a representative hardware environment that may be associated with the computers 114 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
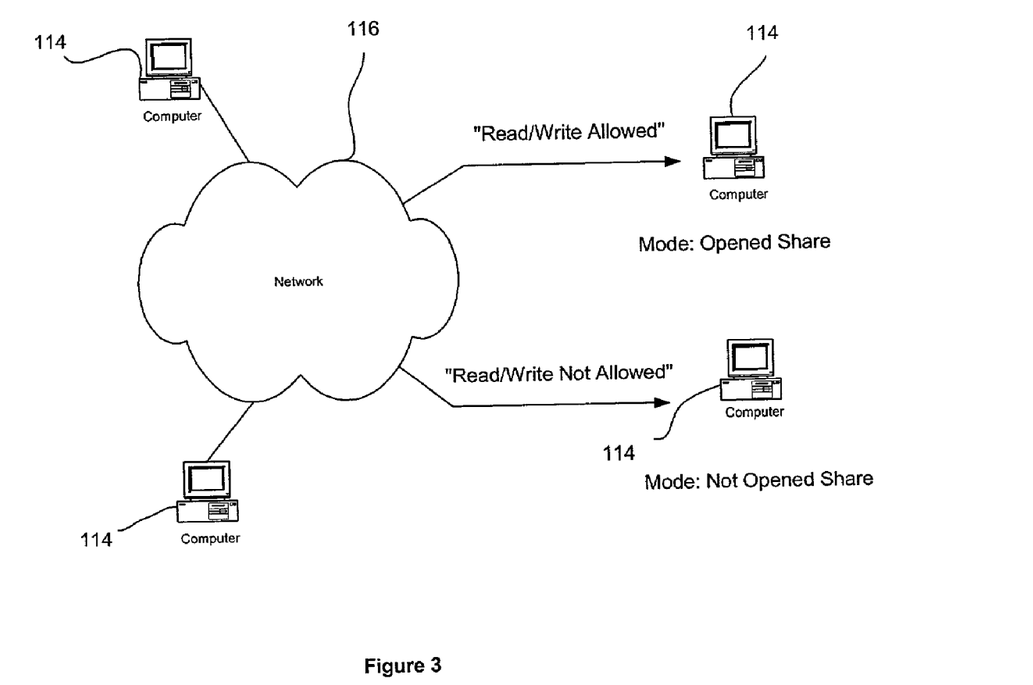
FIG. 3 illustrates the various computers of the network architecture in use, in accordance with one embodiment.

FIG. 3 illustrates the various computers 114 of the network architecture 100 in use, in accordance with one embodiment. As shown, the computers 114 are each capable of operating in an optional "share mode." When such share mode is enabled, other computers 114 have access thereto. In particular, the other computers 114 may gain access to application programs, data, etc. Such access may take the form of read and/or write access. When such share mode is disabled for a particular one of the computers 114, other computers 114 do not have access thereto.

In the present embodiment, a system and method are established to prevent such other computers 114 from initiating a malicious action against the computer 114 in the opened share mode.

Figure 4:
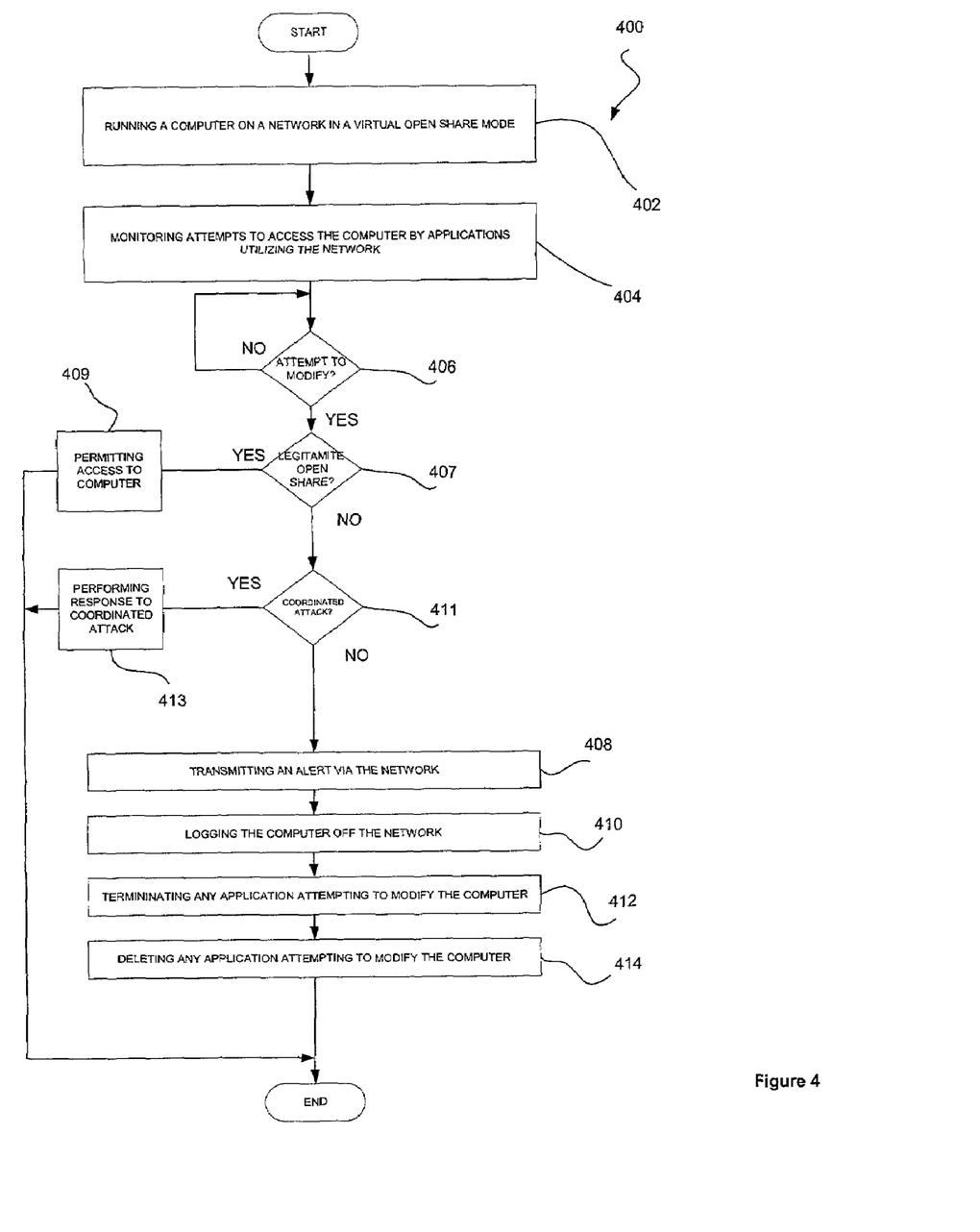
FIG. 4 illustrates a method for protecting a computer in an opened share mode.

FIG. 4 illustrates a method 400 for protecting a computer in an opened share mode. Initially, in operation 402, the various computers 114 may be run on the network 116 in an opened share mode. In the context of the present description, the opened share mode refers to any mode whereby other computers 114 have a higher level of access to a particular computer 114 as opposed to when the particular computer 114 is not in the opened share mode. For example, the opened share mode may allow other computers 114 on the network 116 to access application programs and/or data stored on the computer.

The particular computer 114 may be placed in the opened share mode in any desired manner. For example, the computer 114 may operate in the opened share mode by modifying an application program interface. Such the application program interface may include an operating system application program interface and/or a network application program interface.

Optionally, the opened share mode may apply to each of a plurality of networks of which the particular computer 114 is a member component. Further, the opened share mode may apply only to a predetermined list of application programs and/or data executable on the computer. Such predetermined list may be created manually and/or automatically. If created automatically, the application programs and/or data may be chosen by simply mapping to an existing directory on the computer 114.

Figure 5:
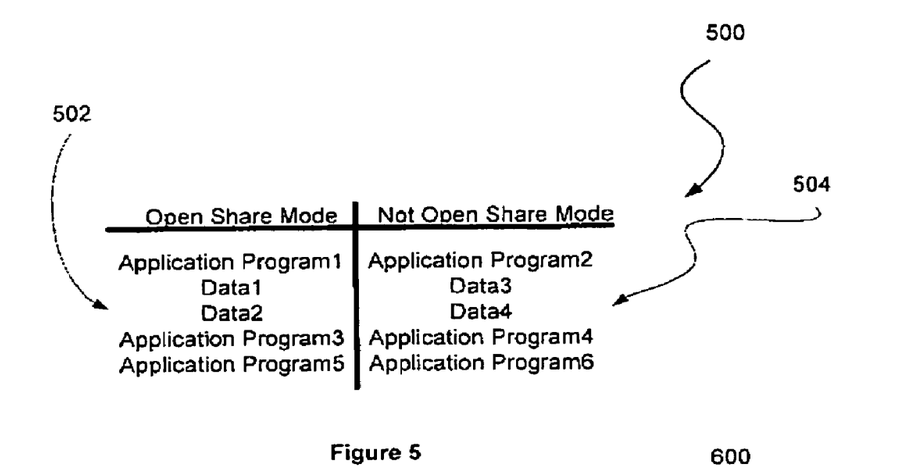
FIG. 5 illustrates an exemplary list including a first set of application programs and/or data that are to be marked as accessible via the opened share mode, and a second set of application programs and/or data as not being accessible.

FIG. 5 illustrates an exemplary list 500 including a first set of application programs and/or data 502 that are to be marked as accessible via the opened share mode, and a second set of application programs and/or data 504 marked as not being accessible.

Figure 6:
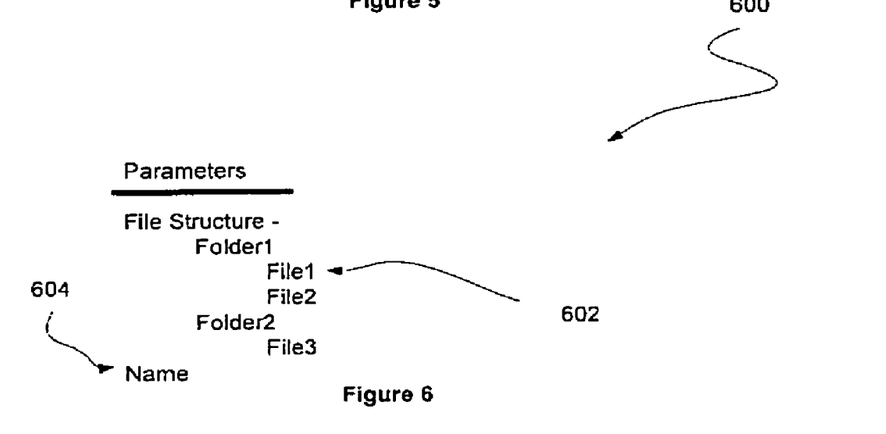
FIG. 6 illustrates exemplary parameters associated with an open share mode, in accordance with one embodiment.

Moreover, the opened share mode may indicate a plurality of parameters. FIG. 6 illustrates exemplary parameters 600 associated with an open share mode, in accordance with one embodiment. As shown, a file structure parameter 602 and a name parameter 604 are provided. These parameters provide a facade indicating a tree structure of files that may be accessed by other computers 114. As an option, such parameters may be randomly selected to prevent detection. By randomly selecting such parameters, writers of malicious code can not easily identify certain parameters as being associated with the security measures set forth herein.

As an option, the computer 114 may be run on the network in a plurality of opened share modes. In other words, a first set of parameters may be selected to operate in the "virtual" opened share mode of the present embodiment, while a second set of parameters may be selected as legitimately accessible in an opened share mode. To a hacker, the parameters of the "virtual" opened share mode may present what appears to be a system directory that can be written.

In operation 404, attempts to access the computer by applications are monitored utilizing the network. This may be accomplished utilizing detection software installed on the computers 114. As each access is monitored, it is determined in decision 406 whether the access includes an attempt to modify the computer 114. In the context of the present description, an attempt to modify the computer 114 may include any action made by another computer 114 that may be construed as malicious. For example, a write to memory in the computer 114, an attempt to copy a virus to memory in the computer 114, etc. may each be considered an attempt to modify the computer 114.

Once it is determined that an application has attempted to modify the computer 114 in decision 406, the response depends on whether the data to be accessed is part of a "virtual" opened share mode or a legitimate opened share mode. As mentioned earlier, a first set of parameters may be selected to operate in the "virtual" opened share mode, while a second set of parameters may be selected as legitimately accessible in an opened share mode. As is now apparent, by increasing the size of the first set of parameters, the chances of catching an attacker attempting an improper access is increased.

If it is determined in decision 407 that an application has attempted to modify data that is part of a legitimate opened share mode, access is permitted in operation 409. However, if it is determined in decision 407 that an application has attempted to modify data that is part of a "virtual" opened share mode, it is then determined in decision 411 as to whether the attempt to modify the computer 114 is part of a coordinated attack.

In particular, decision 411 determines whether the attempt to modify the computer 114 is part of a large number of attempts to modify numerous networked computers 114. More information as to how such decision is made will be set forth in greater detail during reference to FIG. 4A. If it is determined in decision 411 that the attempt to modify the computer 114 is part of a coordinated attack, the coordinated attack is combated by logging the source computer 114 off the network 116 in operation 413.

If it is determined in decision 411 that the attempt to modify the computer 114 is not part of a coordinated attack, a security event may be executed at the computer 114. In the context of the present description, a security event includes any type of event that increases, or is capable of increasing, the security of the computer 114.

For example, in operation 408, the security event may include an alert transmitted via the network 116. Such alert may include information, i.e. a name, time of access, etc., associated with the application attempting to modify the computer 114. The security event may further include logging the computer off the network 116 in response to any attempt to modify the computer 114. See operation 410. By being logged off the network 116, the computer 114 would no longer be operating in the opened share mode. In various embodiments, the computer 114 may simply be removed from an open share mode, instead of logging off the entire network 116.

Further, the security event may include terminating the application attempting to modify the computer 114. See operation 412. Moreover, the security event may include deleting the application attempting to modify the computer 114. See operation 414.

In another embodiment, the present protection technique may be implemented on a gateway (not shown). In such embodiment, the security event may include blocking access to the computer 114, or any other desired security event at the gateway.

Figure 4A:
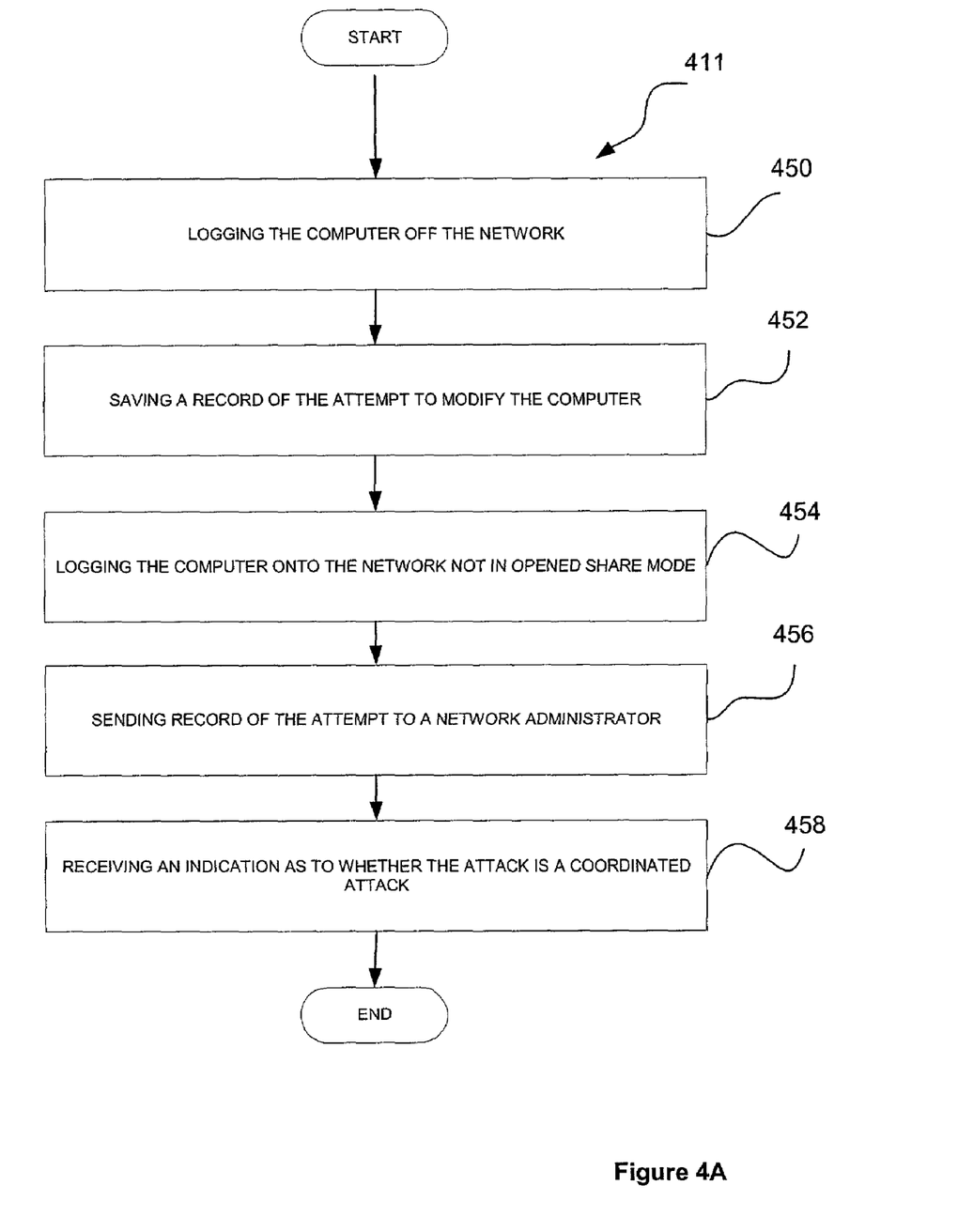
FIG. 4A is a flowchart illustrating a method of determining whether an attempt to modify the computer is part of a large number of coordinated attempts to modify numerous networked computers.

FIG. 4A is a flowchart illustrating a method of determining whether an attempt to modify the computer 114 is part of a large number of coordinated attempts to modify numerous networked computers 114, in accordance with decision 411 of FIG. 4. In other words, any attempt to modify the computer may be utilized in a heuristic analysis for identifying a coordinated attack on multiple computers.

Initially, in operation 450, the computer 114 is temporarily logged off the network 116. Thereafter, a record of the attempt to modify the computer 114 is stored in operation 452. In particular, time and source information may be stored as part of the record.

Next, in operation 454, the computer 114 may be logged back on the network 116, but not in an opened share mode. The computer 114 may then transmit the stored record to a network administrator, or network controller. Note operation 456. It should be noted that the network administrator is capable of tracking or logging such records which are received from multiple computers 114.

If a trend is found which is indicative of a coordinated attack (i.e. denial of service attack, etc.), the network administrator is capable of sending an alert for receipt by the computer 114. Note operation 458. As mentioned earlier, the network administrator is capable of logging the culpable computer 114 off the network to cease the coordinated attack.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for protecting a computer in an opened share mode, comprising:
   (a) running a computer on a network in an opened share mode, wherein the opened share mode indicates a file structure parameter and a name parameter and applies only to a manually selected list of at least one of application programs and data;
   (b) monitoring attempts to access the computer by applications utilizing the network, using the file structure and name parameter;
   (c) determining whether the applications attempt to modify the computer; and
   (d) executing a security event in response to any attempt to modify the computer;
   wherein the opened share mode indicates a plurality of parameters that are randomly selected to prevent detection of a virtuality of the parameters;
   wherein the computer is run in an actual opened share mode and a virtual opened share mode such that the at least one of application programs and data is accessible in the actual opened share mode, and attempted access to the at least one of application programs and data associated with the virtual opened shared mode prompts a security process;
   wherein the security process includes temporarily logging off the network, recording in a record information on any attempt to modify the computer including time and source information, logging the computer back on the network in a mode other than the actual opened share mode, transmitting the information to a third party, determining whether a trend is found indicative of a coordinated attack, and sending an alert and logging a culpable computer off the network based on the determination.

2. The method as recited in claim 1, wherein the opened share mode allows other computers on the network to access data stored on the computer.

3. The method as recited in claim 1, wherein the virtual opened share mode indicates to other computers of an ability to write to the computer.

4. The method as recited in claim 1, wherein the opened share mode applies to each of a plurality of networks of which the computer is a member.

5. The method as recited in claim 1, wherein the computer is run on the network in a plurality of opened share modes.

6. The method as recited in claim 1, wherein any attempt to modify the computer is utilized in a heuristic analysis for identifying a coordinated attack on multiple computers.

7. The method as recited in claim 1, wherein attempts to modify the computer are tracked.

8. The method as recited in claim 1, wherein it is determined whether the applications attempt to write to memory in the computer, and the security event is executed in response to any attempt to write to memory in the computer.

9. The method as recited in claim 1, wherein it is determined whether the applications attempt to copy a virus to memory in the computer, and the security event is executed in response to any attempt to copy the virus to memory in the computer.

10. The method as recited in claim 1, wherein the security event includes logging the computer off the network in response to any attempt to modify the computer.

11. The method as recited in claim 1, wherein the security event includes terminating the application attempting to modify the computer.

12. The method as recited in claim 1, wherein the security event includes deleting the application attempting to modify the computer.

13. The method as recited in claim 1, wherein the security event includes an alert transmitted via the network.

14. The method as recited in claim 13, wherein the alert includes information associated with the application attempting to modify the computer.

15. The method as recited in claim 1, wherein the file structure includes a tree structure.

16. A computer program product, stored on a computer-readable medium, for protecting a computer in an opened share mode, comprising:
(a) computer code for running a computer on a network in an opened share mode, wherein the opened share mode indicates a file structure parameter and a name parameter and applies only to a manually selected list of at least one of application programs and data;
(b) computer code for monitoring attempts to access the computer by applications utilizing the network, using the file structure and name parameter;
(c) computer code for determining whether the applications attempt to modify the computer; and
(d) computer code for executing a security event in response to any attempt to modify the computer;
wherein the opened share mode indicates a plurality of parameters that are randomly selected to prevent detection of a virtuality of the parameters;
wherein the computer is run in an actual opened share mode and a virtual opened share mode such that the at least one of application programs and data is accessible in the actual opened share mode, and attempted access to the at least one of application programs and data associated with the virtual opened shared mode prompts a security process;
wherein the security process includes temporarily logging off the network, recording in a record information on any attempt to modify the computer including time and source information, logging the computer back on the network in a mode other than the actual opened share mode, transmitting the information to a third party, determining whether a trend is found indicative of a coordinated attack, and sending an alert and logging a culpable computer off the network based on the determination.

17. The computer program product as recited in claim 16, wherein the network includes the Internet.

18. The computer program product as recited in claim 16, wherein the opened share mode allows other computers on the network to access data stored on the computer.

19. The computer program product as recited in claim 16, wherein the virtual opened share mode indicates to other computers of an ability to write to the computer.

20. The computer program product as recited in claim 16, wherein the opened share mode applies to each of a plurality of networks of which the computer is a member.

21. The computer program product as recited in claim 16, wherein the computer is run on the network in a plurality of opened share modes.

22. The computer program product as recited in claim 16, wherein any attempt to modify the computer is utilized in a heuristic analysis for identifying a coordinated attack on multiple computers.

23. The computer program product as recited in claim 16, wherein attempts to modify the computer are tracked.

24. The computer program product as recited in claim 16, wherein it is determined whether the applications attempt to write to memory in the computer, and the security event is executed in response to any attempt to write to memory in the computer.

25. The computer program product as recited in claim 16, wherein it is determined whether the applications attempt to copy a virus to memory in the computer, and the security event is executed in response to any attempt to copy the virus to memory in the computer.

26. The computer program product as recited in claim 16, wherein the security event includes logging the computer off the network in response to any attempt to modify the computer.

27. The computer program product as recited in claim 16, wherein the security event includes terminating the application attempting to modify the computer.

28. The computer program product as recited in claim 16, wherein the security event includes deleting the application attempting to modify the computer.

29. The computer program product as recited in claim 16, wherein the security event includes an alert transmitted via the network.

30. The computer program product as recited in claim 29, wherein the alert includes information associated with the application attempting to modify the computer.

31. The computer program product as recited in claim 16, wherein at least a portion of the computer code resides on a gateway.

32. The computer program product as recited in claim 31, wherein the security event includes blocking access to the computer.

33. A system including logic stored on a computer-readable medium, for protecting a computer in an opened share mode, the logic comprising:
(a) logic for running a computer on a network in an opened share mode, wherein the opened share mode indicates a file structure parameter and a name parameter and applies only to a manually selected list of at least one of application programs and data;
(b) logic for monitoring attempts to access the computer by applications utilizing the network, using the file structure and name parameter;
(c) logic for determining whether the applications attempt to modify the computer; and
(d) logic for executing a security event in response to any attempt to modify the computer;
wherein the opened share mode indicates a plurality of parameters that are randomly selected to prevent detection of a virtuality of the parameters;
wherein the computer is run in an actual opened share mode and a virtual opened share mode such that the at least one of application programs and data is accessible in the actual opened share mode, and attempted access to the at least one of application programs and data associated with the virtual opened shared mode prompts a security process;

wherein the security process includes temporarily logging off the network, recording in a record information on any attempt to modify the computer including time and source information, logging the computer back on the network in a mode other than the actual opened share mode, transmitting the information to a third party, determining whether a trend is found indicative of a coordinated attack, and sending an alert and logging a culpable computer off the network based on the determination.

34. A method for protecting a computer in an opened share mode, comprising:
(a) running a computer on a network in a virtual opened share mode and an actual opened share mode, wherein the virtual opened share mode allows other computers on the network to access predetermined data and programs resident on the computer, and indicates to other computers of an ability to write to the computer, and the actual opened share mode indicates a file structure parameter and a name parameter that are capable of actually being accessed by the other computers, and applies only to a manually selected list of at least one of application programs and data;
(b) monitoring attempts to access the computer by applications utilizing the network, using, at least in part, the file structure and name parameter;
(c) determining whether the applications attempt to modify the computer;
(d) tracking the attempts of the applications to modify the computer;
(e) transmitting an alert via the network in response to any attempt to modify the computer, wherein the alert includes information associated with the applications attempting to modify the computer;
(f) logging the computer off the network in response to any attempt to modify the computer; and
(g) deleting any application attempting to modify the computer;
(h) wherein any attempt to modify the computer is utilized in a heuristic analysis for identifying a coordinated attack on multiple computers;
(i) wherein information on any attempt to modify the computer including time and source information is recorded in a record;
(j) wherein the computer is logged back on the network in a mode other than the actual opened share mode prior to performing the heuristic analysis for identifying the coordinated attack and at least one computer is logged off the network based on heuristic analysis;
(k) wherein (d)–(j) are carried out if it is determined that the applications attempt to modify the computer via the virtual opened share mode; and
access is permitted if it is determined that the applications attempt to modify the computer via the actual opened share mode;
wherein the parameters are randomly selected to prevent detection of a virtuality of the parameters.

35. A computer program product stored on a computer-readable medium, for protecting a computer in an opened share mode, comprising:
(a) computer code for running a computer on a network in a virtual opened share mode and an actual opened share mode, wherein the virtual opened share mode allows other computers on the network to access predetermined data and programs resident on the computer, and indicates to other computers of an ability to write to the computer, and the actual opened share mode indicates a file structure parameter and a name parameter that are capable of actually being accessed by the other computers, and applies only to a manually selected list of at least one of application programs and data;
(b) computer code for monitoring attempts to access the computer by applications utilizing the network, using, at least in part, the file structure and name parameter;
(c) computer code for determining whether the applications attempt to modify the computer;
(d) computer code for tracking the attempts of the applications to modify the computer;
(e) computer code for transmitting an alert via the network in response to any attempt to modify the computer, wherein the alert includes information associated with the applications attempting to modify the computer;
(f) computer code for logging the computer off the network in response to any attempt to modify the computer; and
(g) computer code for deleting any application attempting to modify the computer;
(h) wherein any attempt to modify the computer is utilized in a heuristic analysis for identifying a coordinated attack on multiple computers;
(i) wherein information on any attempt to modify the computer including time and source information is recorded in a record;
(j) wherein the computer is logged back on the network in a mode other than the actual opened share mode prior to performing the heuristic analysis for identifying the coordinated attack and at least one computer is logged off the network based on heuristic analysis;
(k) wherein (d)–(j) are carried out if it is determined that the applications attempt to modify the computer via the virtual opened share mode; and
access is permitted if it is determined that the applications attempt to modify the computer via the actual opened share mode;
wherein the parameters are randomly selected to prevent detection of a virtuality of the parameters.

* * * * *